United States Patent Office 3,097,974
Patented July 16, 1963

3,097,974
FUEL CELL ELECTRODE
James E. McEvoy, Morton, and Harold Shalit, Drexel Hill, Pa., assignors to Air Products and Chemicals, Inc., a corporation of Delaware
No Drawing. Filed Nov. 7, 1960, Ser. No. 67,521
15 Claims. (Cl. 136—120)

This invention relates to a fuel cell electrode and a method for making the same, and is particularly directed to the fabrication of porous catalytic electrodes utilizable as the fuel electrode and/or the oxygen electrode of a fuel cell for the electrochemical oxidation of suitable fuels.

Typical of the fuels which may be employed in fuel cells embodying the electrodes of the present invention are hydrogen, hydrocarbons, alcohols, carbonyl compounds and the like; and it is contemplated that the cells will be operated at relatively low temperatures, that is, well below 500° F., and preferably at temperatures not exceeding 200° F.

The invention constitutes an improvement in the formation of porous catalytic electrodes comprising a solid matrix structure composed of materials, such as, carbon or porous nickel, silver, iron, etc., and containing within the pores of the matrix a catalytic material selected from group VIII of the periodic system.

While it is contemplated that the electrodes, for most practical purposes, will have the final form of thin plates, for example, strips or discs, the invention is not so limited; and the electrodes may be of any other desirable shape, such as in the form of a curved, tubular or even cylindrical body.

In accordance with the invention, a porous electrode body, support or matrix of the desired shape, which may be composed, for example, of porous carbon, is coated with a liquid suspension of finely-divided, high surface area, activated carbon impregnated with a noble metal catalyst, the suspension being applied in a manner to cause substantially complete penetration of the catalyst-containing, activated carbon particles into the electrode body and dispersion thereof throughout the larger pores of the electrode matrix. Following the impregnation of the electrode matrix with the suspension, the electrode is dried at approximately ambient temperature. To prevent the finer particles of the catalyst-containing, activated carbon from dropping out of the relatively large pores of the electrode matrix, the dried electrode is coated with a semi-sealing agent which does not unduly inhibit ionic or electrolytic transport between the electrode and the electrolyte in which it may be used.

The electrode matrix is characterized in having a relatively high proportion of large pores, such as in having a major amount of the pore volume contributed by pores having a pore diameter of at least 75 microns. In addition to such porosity characterization, the material forming the matrix is further characterized in being electro-conductive; in having sufficient structural strength to maintain its physical shape and state during use; and in having little or no tendency to react chemically with the electrolyte, fuel and/or oxidizing agent at the conditions and concentrations encountered in the fuel cell whether or not electrical current is being generated therein. In addition to the indicated porous carbon matrix which may be formed, for example, from a suitable large pore carbon, such as commercially available National Carbon Company Grade 20, other materials, such as nickel, silver, iron, and the like, may be employed when they comply with the characterizations mentioned above. The forming and shaping of such matrix bodies may be effected in many well known ways which, as such, form no part of this invention.

The activated carbon with which the noble metal catalyst component is associated initially is in very finely divided state such that it will all pass through 200 mesh sieve, U.S. Standard, and preferably at least 90% finer than 300 mesh. It should have a surface area greater than 600 square meters per gram. In associating such activated carbon with the noble metal component, a slurry is prepared by first preparing an aqueous solution of a suitable chloride salt of the noble metal in the desired amount based on the weight of the noble metal and admixing such solution with the activated carbon in proportions such that the weight of the water in the solution is within the range of about eight to fifteen times the weight of the activated carbon, and preferably about 10 to 12 parts by weight. The thus formed slurry should be made uniform throughout such as by stirring for 3 to 6 hours in order that substantially uniform adsorption of the noble metal component on the activated carbon results. The mixture thus obtained may be treated in a variety of ways to prepare it for subsequent incorporation in the matrix. For example, it may be washed and dried, or dried, or applied to the matrix and then dried. Likewise, as shown below, reduction of the noble metal component may be effected either before or after incorporation in the matrix.

In one preferred method of carrying out the invention, but by no means strictly limited thereto, the activated carbon is a finely ground powder, such as commercially available Darco G–60, having a surface area in the order of about 1000 m.²/gm., and the noble metal catalyst comprises either palladium or platinum applied to the activated carbon as palladium chloride or as chloroplatinic acid, respectively. In either case, the noble metal concentration in the chloride solution is sufficient to give the desired concentration of the noble metal on the finished electrode. In a typical instance, for example, the finely-divided activated carbon may be impregnated with the noble metal chloride in such amount as to produce a noble metal concentration of about 20 wt. percent. As applied to the electrode matrix, the final noble metal concentration may then be in the order of 2–3 wt. percent. The invention, however, is broader than the foregoing example, and it is contemplated that the noble metal shall be applied to the activated carbon in such amount as to give a 1–30 wt. percent, and preferably 5–20 wt. percent, concentration; and that the noble metal concentration on the final electrode shall be in the order of 0.1–5.0 wt. percent. While higher concentrations of noble metal in the final electrode may be employed, there is no particular increase in effectiveness or efficiency to justify the added cost.

When palladium chloride is employed to provide the catalytic element of the electrode, a preferred method of preparation contemplates forming a slurry of palladium chloride and activated carbon which is neutralized to about pH 7.0 with sodium acid carbonate solution to precipitate hydrated palladium oxide, and is then permitted to age for a relatively long period up to about 24 hours. The aged material is filtered and washed with water before being prepared for inclusion in the matrix. Other methods are suitable in which the product may approach or be superior to the carbonate method product. A very convenient method involves impregnation of the activated carbon which adsorbs the palladium chloride so strongly that simple water washing suffices to remove extraneous materials if desired. With the use of chloroplatinic acid to provide the catalytic element the slurry of chloroplatinic acid and activated carbon may be filtered to remove any excess liquid, then dried at ambient temperature. The noble metal is obtained by reduction, as by passing hydrogen or methanol over the powder. Or, optionally, the reduction may be effected in the slurry before filtering and drying. Or, preferably, the reduction may be effected as by hydrogen or alcohol treatment of the material after incorporation in the matrix.

In applying the catalyst-on-activated carbon powder to the electrode body a liquid suspension of the powder is formed in a suitable liquid carrier, such as acetone. Other liquids, such as water, may be used when they are readily volatile and compatible with the sealant. In order to effect the deepest possible penetration of the suspension into the pores of the electrode body, vacuum may be applied at one side of the porous electrode mass while the liquid suspension is applied to the opposite side. Thus, in a case where the electrode body is in the form of a thin circular disc having a thickness of about $\frac{1}{16}$–$\frac{1}{4}$ of an inch, the disc may be placed on a piece of filter paper in a Büchner funnel and the suspension of noble metal catalyst on activated carbon powder may be poured over the surface of the disc while the vacuum is applied from below. The disc may be turned over so that application of the suspension may be made on both sides. The coating may be repeated several times until the desired penetration into the relatively large pores of the electrode body is assured.

The liquid semi-sealant coating is applied to the surface of the electrode to hold the fine particles in place within the pores of the electrode matrix. Such coatings are semi-sealant in the sense that they seal the fine powder within the matrix but are permeable to ionic and electrolytic transport in the fuel cell system. Such coating agents are chosen to have the maximum stability in the environment of use and may be such as silicone polymers, fluorocarbons, polystyrenes and the like in a suitable solvent. For example, such a coating applied to an electrode may be a $\frac{1}{2}\%$ solution of methyl methacrylate in acetone brushed on. Such a coating effectively holds the fine powder in place, is reasonably stable in 30–40% KOH electrolytes, and appears to have little, if any, effect on the utility of the electrode.

Electrodes made in accordance with the invention were experimentally evaluated as fuel electrodes for the electrochemical oxidation of methanol at 55° C. In order to eliminate uncontrolled variables which conceivably could mask the actual performance obtained from the fuel electrodes a half-cell electrode test unit was employed. The fuel electrode to be tested was opposed by a platinum cathode, both immersed in a 40% aqueous KOH electrolyte, and an external source of current was supplied to the platinum cathode. This measured current, representing the total electrode current, is then related to the oxidation potential of the fuel electrode in reference to a mercury-mercuric oxide electrode which is used as a reference electrode. The experimental data indicating the perforance of the electrodes tested, in terms of E.M.F. versus current density, are given in the tables below. The E.M.F. values are relative to the HgO electrode.

TABLE 1

[Electrode containing 2.3 wt. percent Pd]

| E.M.F., volts: | Current density, ma./cm.$^2$ |
| --- | --- |
| 0.84 | Open circuit |
| 0.70 | 47 |
| 0.60 | 100 |
| 0.52 | 140 |

TABLE 2

[Electrode containing 3.0 wt. percent Pd]

| E.M.F., volts: | Current density, ma./cm.$^2$ |
| --- | --- |
| 0.74 | 10 |
| 0.68 | 20 |
| 0.62 | 30 |
| 0.56 | 40 |

TABLE 3

[Electrode containing 0.4 wt. percent Pd]

| E.M.F., volts: | Current density, ma./cm.$^2$ |
| --- | --- |
| 0.56 | 10 |
| 0.49 | 20 |
| 0.43 | 30 |
| 0.38 | 40 |

Electrodes similarly prepared were experimentally evaluated also for the electrochemical oxidation of hydrogen at 55° C., the data for which are given in the table below.

TABLE 4

[Electrode containing approx. 3 wt. percent Pd]

| E.M.F., volts: | Current density, ma./cm.$^2$ |
| --- | --- |
| 0.88 | Open circuit |
| 0.81 | 32 |
| 0.74 | 71 |
| 0.69 | 100 |

TABLE 5

[Electrode containing 0.4 wt. percent Pd]

| E.M.F., volts: | Current density, ma./cm.$^2$ |
| --- | --- |
| 0.88 | Open circuit |
| 0.84 | 40 |
| 0.78 | 80 |
| 0.74 | 100 |
| 0.72 | 110 |
| 0.68 | 140 |

The results shown in Table 1 represent the best data obtained in the methanol-oxygen system. In this particular experiment, however, a slightly modified technique was applied at the start-up in that methanol rather than hydrogen was employed to reduce the palladium prior to evaluation, possibly accounting for the improved performance. The high current density of 140 ma./cm.$^2$ obtained at 0.52 volt represents a desirably low polarization of 0.3 volt from open circuit.

The results shown in Table 5 represent the best data obtained in the hydrogen-oxygen system. It is to be noted that only a 0.2 volt polarization occurred at a current density of 140 ma./cm.$^2$.

An electrode for use in an acid system was prepared substantially as described above. The formed electrode was tested using 30% $H_2SO_4$ as the electrolyte. Test results, as polarization values, are presented in Table 6 below. Assuming the base point of a theoretically perfect electrode (as calculated from free energy data) as being 0, the extent to which an electrode deviates from this potential as current is withdrawn from a cell is a measure of the polarization voltage and therefore represents a decline in thermodynamic efficiency. Table 6 illustrates polarization of the fuel electrode (as described) in acid medium for $H_2$.

TABLE 6

*Polarization of Fuel Electrode Using $H_2$ as Fuel in Acid Electrolyte*

| Current density, ma./cm.$^2$ | Polarization, E.M.F., volts, 30% $H_2SO_4$ |
|---|---|
| 40 | 0.10 |
| 100 | 0.23 |
| 150 | 0.34 |

In our copending application, Serial No. 67,467, filed of even date herewith we have described a novel paste-form electrode which differs in several ways from the instant invention.

Obviously, many modifications and variations of the present invention as hereinbefore set forth may be made without departing from the spirit and scope thereof and therefore only such limitations should be imposed as are indicated in the appended claims.

What is claimed is:

1. The method for making a catalytic fuel cell which comprises the steps of: forming a water solution of a noble metal compound selected from the group consisting of palladium chloride and chloroplatinic acid, the metallic component thereof being present in the amount required in the finished electrode; combining with said solution a quantity of high surface area, activated carbon powder finer than 200 mesh so as to form a slurry; admixing the slurry-forming components for a time sufficient to effect maximum adsorption of said noble metal compound on said activated carbon; removing excess liquid from said slurry and further drying the activated carbon containing adsorbed noble metal compound; forming a suspension of said activated carbon containing adsorbed noble metal; introducing said suspension by deposition into the pores of a thin porous electrode matrix having an average pore diameter substantially greater than the particle size range of said activated carbon powder; and drying said matrix.

2. The method as in clam 1 in which said porous electrode matrix is composed essentially of material selected from the group consisting of carbon, nickel, silver and iron.

3. The method as in claim 2 in which said porous electrode matrix comprises a carbon mass having at least a major proportion of the available pore volume composed of pores having a diameter of at least seventy-five microns.

4. The method as in claim 1 in which said noble metal compound is palladium chloride.

5. The method as in claim 4 including the steps of: neutralizing said slurry by addition of saturated sodium bicarbonate solution, so as to precipitate palladium oxide, and aging the mixture for a period up to about 24 hours.

6. The method as in claim 1 in which said noble metal compound is chloroplatinic acid.

7. The method as in claim 1 in which the noble metal component is obtained by reduction.

8. The method as in claim 7 in which said reduction is effected by hydrogen treatment.

9. A fuel cell electrode comprising:
   (a) A noble metal, selected from the group consisting of platinum and palladium, present in an amount within the range of 0.5 to 5.0% by weight of the electrode;
   (b) An activated carbon having adsorbed thereon said noble metal, said activated carbon having a surface area in excess of 600 square meters per gram and having a particle size smaller than 200 mesh, U.S. Standard;
   (c) A porous, electro-conductive, structurally strong and inert matrix in which a major amount of the pore volume is contributed by pores having a diameter of at least 75 microns, said pores being filled with said activated carbon from (b) having adsorbed thereon said noble metal from (a).

10. A fuel cell electrode as in claim 9, including
   (d) Means at the outer surface of said electrode adapted to retain the particles of said activated carbon within the pores of said matrix.

11. A fuel cell electrode as in claim 10 wherein said means (d) comprises a semi-sealant coating applied as a liquid to the surface of the electrode.

12. The method as in claim 1 in which said final drying step is carried out substantially at ambient temperature.

13. The method as in claim 1 including the step of applying a semi-sealant coating upon the surface of said matrix to retain fine size particles of said activated carbon within the pore structure of said matrix.

14. The method as in claim 1 in which said activated carbon and said water solution of a noble metal compound are admixed in such proportion that the weight of the water is about 8 to 15 times the weight of the activated carbon.

15. The method as in claim 14, in which said weight of the water is about 10 to 12 times said weight of the activated carbon.

References Cited in the file of this patent

UNITED STATES PATENTS 2,384,463    Gunn et al. _____ Sept. 11, 1945

UNITED STATES PATENT OFFICE
CERTIFICATE OF CORRECTION

Patent No. 3,097,974                        July 16, 1963

James E. McEvoy et al.

It is hereby certified that error appears in the above numbered patent requiring correction and that the said Letters Patent should read as corrected below.

Column 5, line 21, after "cell" insert -- electrode --; line 40, for "clam" read -- claim --.

Signed and sealed this 21st day of April 1964.

(SEAL)
Attest:

ERNEST W. SWIDER

Attesting Officer

EDWARD J. BRENNER

Commissioner of Patents